March 31, 1942.  A. F. PONTO  2,277,777
DEVICE FOR HULLING PEAS
Filed Feb. 28, 1940
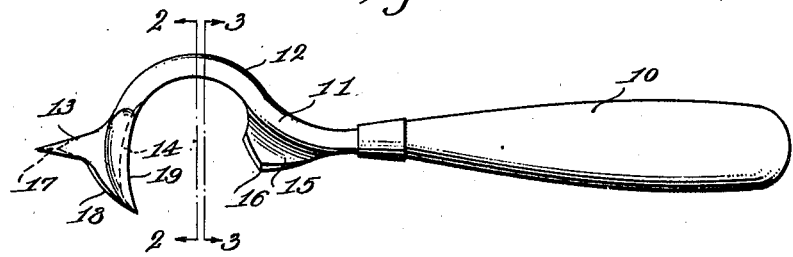
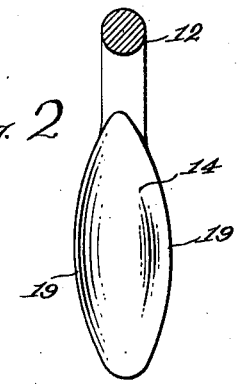
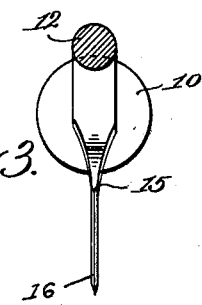
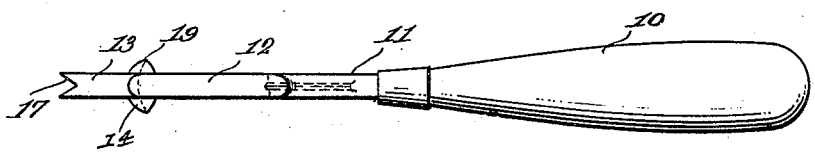
Inventor
Alton F. Ponto
By Ralph Burch
Attorney Patented Mar. 31, 1942

2,277,777

UNITED STATES PATENT OFFICE 2,277,777

DEVICE FOR HULLING PEAS

Alton F. Ponto, Riceton, Saskatchewan, Canada

Application February 28, 1940, Serial No. 321,313

3 Claims. (Cl. 130—30)

This invention relates to devices for hulling peas and other leguminous plants, and particularly to a manually operated tool that is adapted to meet all the requirements of such an operation.

An important object of this invention is to provide a pod cutting tool that will pince the legume, slit the legume and remove the peas therein in one operation.

A further important object is to provide a mechanically simple device that may be used in factories or in the home without special skill required.

Other objects that will readily be seen are; first, to provide an inexpensive tool of this class; second, to provide means whereby it may be readily sharpened without special sharpening tools and third, to devise a tool that is adapted to mass manufacture.

The analogous tools in the art are confined to one function only, this in the case of large factories, slows up production considerably when used as a kitchen utensil they are usually discarded entirely due to their limited use.

As stated in the objects this difficulty may now be overcome, as will be described hereinafter.

With the above noted objects and others in view which may appear as the description proceeds the invention resides in the novel construction and arrangement of cooperating parts as hereinafter more specifically set forth, claimed and shown in the accompanying drawing forming part of this application and in which:

Fig. 1 is a side elevation view of the invention.

Fig. 2 is a sectional view along the line 2—2 of Fig. 1.

Fig. 3 is a sectional view along the line 3—3 of Fig. 1.

Fig. 4 is a top plan view of the invention.

Referring more in detail to the drawing in which similar reference characters designate corresponding parts throughout the several views it will be seen the invention consists of a handle 10, to which a shank 11, is secured. The shank is extended into a semi-circular curve 12, and near its outer extremity a projecting blade 13, is cast, the details thereof will be explained as the description proceeds. The inner surface of the extremity of the curve 12, is cast into a scoop or spoon-like body 14.

Reverting to the shank 11, once more, it may be seen that its lower surface is flattened as at 15. The edge of this flattened surface is sharpened and machined into a substantially right angle blade 16. The member 13, is tapered to its extremity and machined into a V-shaped blade 17, (Fig. 4) at the said extremity.

The lower portion of the said member is met by a further blade 18, which curves to the extremity of the spoon 14. It may be noted the edges of the said spoon are rolled at 19, to prevent the said edges from piercing the walls of the legumes or pods.

The operation of the device is as follows:

A pod is preferably held in the hand between the thumb and fingers, the V-shaped blade 17, is first pressed into the pod to cut the upper suture, that is the suture to which the peas are not attached which is easily and quickly identified from looking at the legume.

When the blade 17 has reached a certain point the suture is split by the curved blade 18, which provides an opening in the legume for the spoon like member 14, to automatically enter.

The operator then adjusts his hand to draw the spoon like member 14 through the legume as the device is drawn thus the blade 16 slits the suture in front of the member 14 which scoops the peas, beans, etc., over the sides of the legume and into a conveniently placed receptacle.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

1. A device for hulling seed pods, comprising a handle, a shank secured to the said handle, the said shank extending in a semi-circular curved portion, a wedge shaped projection on the outer surface of the curved portion having a V-shaped blade thereon, a scoop formed integral with the inner surface of the curved portion and a blade extending from the extremity of the said scoop to the said wedge shaped projection and a blade aligned with and projecting from the shank proper at the end of said curved portion near said handle on the under surface thereof, substantially as set forth.

2. A device for hulling seed pods comprising a handle, a shank extending longitudinally from one end of said handle in a semi-circular curve, a concavo-convex scoop formed at the outer end of the curved portion and disposed in a plane substantially at right angles to the axis of the handle with its concaved surface facing the end of the handle, a cutting blade formed integral with the convex surface of said scoop extending from its outer extremity towards the shank, and a knife blade formed on the handle end of the curved portion of the shank and projecting therefrom in alinement with said scoop.

3. A devise for hulling seed pods comprising a handle, a shank extending longitudinally from said handle, a concavo-convex scoop formed at the outer end of said shank with the concave side in facing relation to the end of said handle, a cutting blade formed integral with the convex side of said scoop extending from its outer extremity towards the shank, and a knife blade projecting from the shank adjacent said handle in alinement with said scoop and on a level with the outer extremity of the scoop.

ALTON F. PONTO.